(12) United States Patent
Christiansen et al.

(10) Patent No.: US 9,828,290 B2
(45) Date of Patent: Nov. 28, 2017

(54) GRAPHITE OXIDE ENTRAINMENT IN CEMENT AND ASPHALT COMPOSITE

(71) Applicant: Garmor Inc., Orlando, FL (US)

(72) Inventors: Sean Christiansen, Orlando, FL (US); David Restrepo, Orlando, FL (US); Richard Stoltz, Plano, TX (US); Jeff Bullington, Orlando, FL (US)

(73) Assignee: GARMOR INC., Orlando, FL (US)

( * ) Notice: Subject to any disclaimer, the term of this patent is extended or adjusted under 35 U.S.C. 154(b) by 0 days.

(21) Appl. No.: 15/503,171

(22) PCT Filed: Aug. 18, 2015

(86) PCT No.: PCT/US2015/045657
§ 371 (c)(1),
(2) Date: Feb. 10, 2017

(87) PCT Pub. No.: WO2016/028756
PCT Pub. Date: Feb. 25, 2016

(65) Prior Publication Data
US 2017/0233290 A1    Aug. 17, 2017

Related U.S. Application Data

(60) Provisional application No. 62/038,481, filed on Aug. 18, 2014.

(51) Int. Cl.
*C04B 14/02* (2006.01)
*C04B 28/04* (2006.01)
*C04B 14/06* (2006.01)
*C01B 31/04* (2006.01)

(52) U.S. Cl.
CPC .......... *C04B 14/026* (2013.01); *C01B 31/043* (2013.01); *C01B 31/0469* (2013.01); *C04B 14/06* (2013.01); *C04B 28/04* (2013.01)

(58) Field of Classification Search
CPC ... C01B 31/04; C01B 31/043; C01B 31/0469; C01B 31/0476; C04B 14/00; C04B 14/026; C04B 22/02; C04B 26/26; C04B 28/04; C04B 40/0021
See application file for complete search history.

(56) References Cited

U.S. PATENT DOCUMENTS

| | | | |
|---|---|---|---|
| 2,459,520 | A | 1/1949 | Greenshields |
| 5,360,582 | A | 11/1994 | Boyd et al. |
| 5,506,061 | A | 4/1996 | Kindl et al. |
| 6,348,279 | B1 | 2/2002 | Saito et al. |
| 7,623,340 | B1 | 11/2009 | Song et al. |
| 8,168,964 | B2 | 5/2012 | Hiura et al. |
| 8,216,541 | B2 | 7/2012 | Jang et al. |
| 8,580,132 | B2 | 11/2013 | Lin et al. |
| 2002/0008031 | A1 | 1/2002 | Barsukov et al. |
| 2002/0119358 | A1 | 8/2002 | Rock |
| 2004/0000735 | A1 | 1/2004 | Gilbert, Sr. et al. |
| 2004/0033189 | A1 | 2/2004 | Kaschak et al. |
| 2005/0191471 | A1 | 9/2005 | Haggquist |
| 2005/0196636 | A1 | 9/2005 | Kawakami et al. |
| 2005/0208319 | A1 | 9/2005 | Finley et al. |
| 2007/0219336 | A1 | 9/2007 | Ito |
| 2007/0284557 | A1 | 12/2007 | Gruner et al. |
| 2008/0048152 | A1 | 2/2008 | Jang et al. |
| 2008/0206124 | A1 | 8/2008 | Jang et al. |
| 2008/0318110 | A1 | 12/2008 | Budinski et al. |
| 2009/0017211 | A1 | 1/2009 | Gruner et al. |
| 2009/0092747 | A1 | 4/2009 | Zhamu et al. |
| 2009/0140801 | A1 | 6/2009 | Ozyilmaz et al. |
| 2010/0006445 | A1 | 1/2010 | Tomantschger |
| 2010/0056819 | A1 | 3/2010 | Jang et al. |
| 2010/0147188 | A1 | 6/2010 | Mamak et al. |
| 2010/0151318 | A1 | 6/2010 | Lopatin et al. |
| 2010/0209731 | A1 | 8/2010 | Hamano |
| 2010/0239870 | A1 | 9/2010 | Bowen et al. |
| 2011/0017585 | A1 | 1/2011 | Zhamu et al. |
| 2011/0041980 | A1 | 2/2011 | Kim et al. |
| 2011/0049437 | A1 | 3/2011 | Crain et al. |
| 2011/0088931 | A1 | 4/2011 | Lettow et al. |
| 2011/0143018 | A1 | 6/2011 | Peng et al. |
| 2011/0223405 | A1 | 9/2011 | Compton et al. |
| 2011/0256376 | A1 | 10/2011 | Compton et al. |
| 2011/0267673 | A1 | 11/2011 | Agrawal et al. |
| 2011/0274610 | A1 | 11/2011 | Paquette et al. |
| 2011/0281034 | A1 | 11/2011 | Lee et al. |
| 2012/0025420 | A1 | 2/2012 | Utashiro et al. |
| 2012/0055612 | A1 | 3/2012 | Ahmed et al. |

(Continued)

FOREIGN PATENT DOCUMENTS

| | | |
|---|---|---|
| CN | 102021633 A | 4/2011 |
| CN | 103058541 A | 4/2013 |
| CN | 103130436 A | 6/2013 |
| CN | 103408880 A | 11/2013 |
| CN | 103757823 A | 4/2014 |
| CN | 103819915 A | 5/2014 |
| CN | 103962102 A | 8/2014 |
| CN | 104319372 A | 1/2015 |
| CN | 104446176 | 3/2015 |
| EP | 2771395 A1 | 9/2014 |

(Continued)

OTHER PUBLICATIONS

Extended European Search Report and Opinion for EPO 12844344.7 dated Oct. 22, 2015, 8 pp.
Extended European Search Report and Opinion for EPO 14760912.7 dated May 11, 2016, 8 pp.
Extended European Search Report and Opinion for EPO 14759787.6 dated Oct. 6, 2016, 13 pp.

(Continued)

Primary Examiner — Anthony J Green
(74) Attorney, Agent, or Firm — Edwin S. Flores; Chalker Flores, LLP

(57) ABSTRACT

A method of producing dispersed of high quality graphene/graphite oxides in a powder matrix to then be reacted to form a composite. Where the powders have similar hydrophobicity and the graphene/graphite oxides has minimal surface oxidation or minimal epoxy group and where the powders are sonically mixed.

20 Claims, No Drawings

(56) References Cited

U.S. PATENT DOCUMENTS

| | | |
|---|---|---|
| 2012/0107562 A1 | 5/2012 | Bolotin et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0240033 A1 | 9/2013 | Jeon et al. |
| 2013/0272950 A1 | 10/2013 | Yun et al. |
| 2014/0018480 A1 | 1/2014 | Lee et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2016/0002045 A1 | 1/2016 | Blair |
| 2016/0016803 A1 | 1/2016 | Stoltz et al. |

FOREIGN PATENT DOCUMENTS

| | | | |
|---|---|---|---|
| EP | 2964573 A1 | 1/2016 | |
| EP | 2964574 A4 | 5/2016 | |
| JP | 2016508953 A | 3/2016 | |
| KR | 1020110084110 A | 7/2011 | |
| KR | 1020110093666 A | 8/2011 | |
| KR | 1020130090979 A | 8/2013 | |
| KR | 101625311 B1 | 5/2016 | |
| WO | 2008108383 A1 | 9/2008 | |
| WO | 2009059193 A1 | 5/2009 | |
| WO | 2010091352 A2 | 8/2010 | |
| WO | 2011014242 A1 | 2/2011 | |
| WO | 2011074125 A1 | 6/2011 | |
| WO | 2011078639 A2 | 6/2011 | |
| WO | 2011086391 A1 | 7/2011 | |
| WO | 2011087301 A2 | 7/2011 | |
| WO | 2011162727 A1 | 12/2011 | |
| WO | 2012058553 A2 | 5/2012 | |
| WO | 2012148880 A2 | 11/2012 | |
| WO | 2013001266 A1 | 1/2013 | |
| WO | 2013009003 A1 | 1/2013 | |
| WO | 2013062951 A1 | 5/2013 | |
| WO | 2013096990 A1 | 7/2013 | |
| WO | 2014138587 A1 | 9/2014 | |
| WO | 2014138596 A1 | 9/2014 | |
| WO | 2015065893 A1 | 5/2015 | |
| WO | 2016028756 A1 | 2/2016 | |
| WO | 2016040612 A1 | 3/2016 | |
| WO | 2016123080 A1 | 8/2016 | |
| WO | 2016149150 A1 | 9/2016 | |
| WO | 2016154057 A1 | 9/2016 | |
| WO | 2016160400 A1 | 10/2016 | |
| WO | 2016167981 A1 | 10/2016 | |
| WO | 2016200469 A1 | 12/2016 | |
| WO | 2017053204 A1 | 3/2017 | |

OTHER PUBLICATIONS

FMC (http://ww.peroxychem.com/media/90826/aod_brochure_persulfate.pdf, downloaded on Jan. 19, 2017) 16 pp.

International Search Report and Written Opinion for PCT/US2012/061457 from KIPO dated Mar. 15, 2013, 10 pp.

International Search Report and Written Opinion for PCT/US2014/021810 from KIPO dated Jul. 14, 2014, 10 pp.

International Search Report and Written Opinion for PCT/US2014/021765 from KIPO dated Jul. 24, 2014, 11 pp.

International Search Report and Written Opinion for PCT/US2014/062371 from KIPO dated Feb. 11, 2015, 12 pp.

International Search Report and Written Opinion for PCT/US2015/045657 from KIPO dated Oct. 27, 2015, 6 pp.

International Search Report and Written Opinion for PCT/US2015/049398 from KIPO dated Dec. 16, 2015, 13 pp.

International Search Report and Written Opinion for PCT/US2016/014873 from KIPO dated May 13, 2016, 15 pp.

International Search Report and Written Opinion for PCT/US2016/022229 from KIPO dated Jun. 27, 2016, 15 pp.

International Search Report and Written Opinion for PCT/US2016/023273 from KIPO dated Jul. 12, 2016.

International Search Report and Written Opinion for PCT/US2016/023435 from KIPO dated May 30, 2016, 13 pp.

International Search Report and Written Opinion for PCT/US2016/025307 from KIPO dated Sep. 12, 2016, 11 pp.

International Search Report and Written Opinion for PCT/US2016/025338 from KIPO dated Jul. 25, 2016, 12 pp.

International Search Report and Written Opinion for PCT/US2016/052292 from KIPO dated Nov. 21, 2016, 14 pp.

Academic Press Dictionary of Science and Technology ("Flake", p. 1, obtained onkine Aug. 19, 2016).

Ebinezar, et al., "Analysis of hardness test for aluminum carbon nanotube metal matrix and graphene," Indian Journal of Engineering, vol. 10, No. 21, 2014, pp. 33-39.

Fang, Ming et al., "Covalent polymer functionalization of graphenenanosheets and mechanical properties of composites" Journal of Materials Chemistry, 2009, vol. 19, No. 38, pp. 7098-7105.

Herman, Allen et al., "Bipolar plates for PEM fuel cells: a review." International Journal of Hydrogen Energy, 2005, vol. 30, No. 12, pp. 1297-1302.

Hwang, T., et al., "One-step metal electroplating and patterning on a plastic substrate using an electrically-conductive layer of few-layer graphene," Carbon, Sep. 17, 2011, vol. 50, No. 2, pp. 612-621.

Jeon, In-Yup et al., "Edge-carboxylated graphene nanosheets via ball milling." Proceedings of the National Academy of Sciences of the United States of AmericaPNAS, Apr. 10, 2012, vol. 109, No. 15, pp. 5588-5593.

Liu, Y. B., et al., "Recent development in the fabrication of metal matrix-particulate composites using powder metallurgy techniques," Journal of Materials Science, vol. 29, No. 8, 1994, pp. 1999-2007.

McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".

Merriam-Webster ("Definition of Flake" p. 1-9, obtained online Aug. 19, 2016).

Mohajerani, E., et al., "Morphological and thickness analysis for PMMA spin coated films," Journal of Optoelectronics and Advanced Materials, vol. 9:12, Dec. 2007, p. 3901-3906.

Moustafa, S.F., et al., "Copper matrix SiC and A1203 particulate composites by powder metallurgy technique," Materials Letters, 2002, vol. 53, No. 4, pp. 244-249.

Ong, T. S., et al, "Effect of atmosphere on the mechanical milling of natural graphite," Carbon, 2000, vol. 38, No. 15, pp. 2077-2285.

Rafiee, Mohammad A. et al., "Fracture and fatigue in graphene nanocomposites." Small, 2010, vol. 6, No. 2, pp. 179-183.

Steurer, Peter et al., "Functionalized graphenes and thermoplasticnanocomposites based upon expanded graphite oxide." Macromolecular Rapid Communications, 2009, vol. 30, Nos. 4-5, pp. 316-327.

Taeseon, Hwang, et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.

Wang, Xin et al., "In situ polymerization of graphene nanosheets andpolyurethane with enhanced mechanical and thermal properties." Journal of materials Chemistry, 2011, vol. 21, No. 12, pp. 4222-4227.

USP Technologies, "What is the pH of H2O2 solutions?," http://www.h2o2.com/faqs/FaqDetail.aspx?fld=26, accessed Jan. 19, 2017, 2 pp.

(56) References Cited

OTHER PUBLICATIONS

Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Graphene Films Prepared by Electrophoretic Deposition." Advanced Materials, vol. 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Machine Translation of CN104446176, 2 pp. [Mar. 2015].
Machine Translation of CN10375823, 12 pp. [Apr. 2014].
Machine Translation of CN104319372, 13 pp. [Jan. 2015].
Machine Translation of CN103408880, 20 pp. [Nov. 2013].
Machine Translation of CN103130436, 12 pp. [Jun. 2013].
Machine Translation of JP2016508953, 19 pp. [Mar. 2016].
Machine Translation of KR101625311, 21 pp. [May 2016].
Machine Translation of KR20110084110, 24 pp. [Jul. 2011].
Machine Translation of KR20110093666, 20 pp. [Aug. 2011].
Machine Translation of KR20130090979, 12 pp. [Aug. 2013].
English translation of WO2011/078639 A2. [Jun. 2011].

GRAPHITE OXIDE ENTRAINMENT IN CEMENT AND ASPHALT COMPOSITE

CROSS-REFERENCE TO RELATED APPLICATIONS

This application is the National Stage of International Application No. PCT/US2015/045657, filed on Aug. 18, 2015 claiming the priority to U.S. Provisional Application No. 62/038,481 filed on Aug. 18, 2014, the contents of each of which are incorporated by reference herein.

TECHNICAL FIELD OF THE INVENTION

The present invention relates in general to the field of graphite, and more particularly, to compositions and methods of graphite oxide entrainment in cement and asphalt composite.

BACKGROUND OF THE INVENTION

Without limiting the scope of the invention, its background is described in connection with composite materials.

Graphene is one of the strongest materials ever tested. Various research institutes have loaded hosts with carbon allotropes such as carbon nanotubes (CNT), graphene flakes (GF), graphene oxide (GO), and graphite oxide and have seen up to a 200% increase in tensile strength in the loaded host, but with inconsistent results. Measurements have shown that graphene has a breaking strength 200 times greater than steel, with a tensile modulus (stiffness) of 1 TPa (150,000,000 psi). An Atomic Force Microscope (AFM) has been used to measure the mechanical properties of a suspended graphene sheet. Graphene sheets held together by van der Waals forces were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid.

Nano-silica's spherical shape, carbon nanotubes (CNTs) and Hummers' based GO that has both surface oxidation, epoxy groups and surface distortion have high-aspect-ratio. CNTs and Hummers' based graphene/graphite oxide are suspended and dispersed in water then combined with Ordinary Portland Cement and or other materials reacted to form a cementitious composite.

Depending on whether they are single walled CNTs (SWCNTs) or multi-walled CNTs (MWCNTs), generally have the diameter of 1-3 mm or 5-50 mm, respectively. The length of CNTs can be up to centimeters, which gives an aspect ratio exceeding 1000. CNTs also exhibit extraordinary strength with moduli of elasticity on the order of TPa and tensile strength in the range of GPa. With the concurrent benefits of high aspect ratio and excellent mechanical performance, CNTs have been found to improve the toughness and strength of cementitious matrix materials. Incorporation of CNTs in cement composites has proven to be complex, yielding inconsistent results. Researchers have found that the addition of CNTs results in little change in strength or even deterioration of the composite in some cases. Poor dispersion of CNTs in the water based cement matrix is due to the weak bonding between the CNTs and the cement matrix. Owing to strong Van der Waal's attractive forces between particles, CNTs tend to form agglomerates or self-attraction/assembly similar to that seen in carbon black creating defect sites in the composites. CNTs without a dispersing agent had worse mechanical properties than the plain cement paste. Non-uniform distribution/dispersion of CNT bundles are responsible for the deterioration of the mechanical properties.

Hummers' based graphite/graphene oxide (HGGO) is produced by using concentrated acids and oxidants and often required significant purification of the HGGO product. HGGO is more readily suspendable/dispersible in a polar solvent (ultra pure water) because the high level of oxidation making it hydrophilic. The HGGO can also irreversibly precipitate from the suspension in the polar solvent as a function of pH or exposure to mobile ions in a short period of time. This forces the suspension/dispersion of the HGGO to be done on site using tap water, done at a remote facility using ultra pure (DI) water or done at a remote facility and continuously mixed until it is used. If the HGGO suspension is improperly handled it will result in aggregation of the HGGO resulting in defects and damaging the physical properties in the composite. Additionally, strongly oxidized HGGO has mechanical distortions on the surface of the flake and epoxy groups due to the oxidation process. The physical distortions prevent optimal improvement of the physical properties in a cementations material. In addition to the physical damage to the graphene/graphite oxide flake the creation of epoxy groups prevent the formation of chemical reaction in the cementitious material.

SUMMARY OF THE INVENTION

Despite these nanoscale mechanical properties, graphene or graphene oxide has not been able to transition to a macro-scale mechanical structure. The process of producing a loaded host does not translate to a viable composite structure. The inability to translate the technology to a viable composite structure is a combination of technical issues and cost factors, including uniform distribution/dispersion of the suspension in the host material. Traditionally, dispersion has been accomplished in a liquid host by a combination of sonication and stirring. In some cases the liquid or the particles are modified through functionalization of the particle or additive, or by modifying the host's viscosity, pH, or through the use of surfactants. Interactions between the liquid host and particle, particle-to-particle interaction/attraction and the settling of the particles significantly and negatively impacts the uniformity of a dispersion exacerbating any resulting composite.

Graphene is an allotrope of carbon. Graphene's purest form is a one-atom-thick planar sheet of $sp^2$-bonded carbon atoms that are densely packed in a honeycomb or hexagonal crystal lattice. In the last few years scientists have identified multi-layer graphene oxide or a few layers of graphite oxide to be of sufficient strength on electrical conductivity to be useful as an additive in a host to provide superior mechanical, chemical, thermal, gas barrier, electrical, flame retardant and other properties compared to the native host. Improvement in the physicochemical properties of the host depends on: 1) a uniform distribution and entrainment of the graphene flake, 2) optimizing the interfacial bonding between the graphene flake and host's matrix, 3) removal of gasses entrained in the host during processing, 4) optimizing the additive's innate properties, e.g. flatness, 5) optimizing the thickness to surface-area ratio of the graphene flake and/or the chemical functionalization or decoration on the flake/particle.

Optimal properties of the graphene flake: the present inventors have found that the performance of a graphene flake is dominated by the texture and the surface, as well as the oxidation/functionalization that will affect the dispersibility of the flake in a host. A Hummers' based process produces graphene flakes that have both a surface and edge oxidation. The oxidation is in the form of hydroxyl, carboxyl, (COOH) and epoxy groups on the surface and/or edge of the of the graphene/graphite oxide. There is a high level of oxidation and exfoliation inherent in the Hummers' or modified based Hummers' process results in permanent corrugated disfiguration of the graphene flake. The permanent corrugated structure degrades the chemical, mechanical, electrical and thermal properties of graphene flake. Hence a surface oxidized graphene flake has lower performance than the graphene layers originally demonstrated when the single atomic layer of graphene was first discovered in 2004. This can be explained by simple theoretical analysis where the corrugated structure induces different shearing and loading forces to the surrounding host as the corrugated structure gives a third dimension to the ideal two dimension graphene structure. In the transmission of phonons or electrons, the ideal structure is a uniform flat large area graphene structure. A corrugated structure induces resistance and inductance to the transmission of phonons and electrons hence a planar flake has higher performance in the electron and phonon transmission relative to a corrugated structure in the surface of the oxidized graphene flake. In addition, the epoxy groups can interact with a specific host or sterically inhibit interaction thereby reducing or eliminating the effectiveness of using a graphene/graphite oxide as an additive or uniformity of a dispersion.

A mechanochemical approach to producing graphene/graphite oxide flakes, comprising: preparing graphene flakes with a surface area to thickness ratio greater than 300 Angstroms, and thickness of less than 160 Angstroms, wherein the graphene flakes have no significant physical surface distortions and have a surface polarity; with edge decorated/oxidized COOH groups. These graphene/graphite oxide flakes as made have an oxidation level between 3% (w) and 17% (w) and can be thermally reduced to have an oxidation level between 0.0% (w) and 3% (w). The as made graphene/graphite oxide flake is ideal to be used in a polar host while the reduced graphene/graphite oxide flake is ideal for a non polar host. This matches the polarity as said graphene/graphite oxide flakes; suspending said graphene flakes in said host by mixing until the suspension is uniform. Due to the interaction between the graphene/graphite oxide flake and a liquid host as well as the effects gravity has on a suspension a liquid host represents significant technical challenges in creating and maintaining a uniform dispersion of the graphene/graphite oxide flakes in the liquid host. Powder mixing of two or more diverse materials has been shown to be effective in uniformly mixing and dispersing disparate powders independent of the polar (hydrophilic) or non-polar (hydrophobic) nature of those powders. Powder mixing also breaks self-attraction or agglomeration that can occur over time, resulting from the production of the graphene/graphite oxide flakes or that can occur post production due to the close packing of the graphene/graphite oxide flakes. When the dispersed powders are reacted by thermal, mechanical, chemical energy or caused to react with the addition of a solvent that causes the powders to react, the powders need to have the same or very similar polar (hydrophilic) or non-polar (hydrophobic) nature to form a viable composite.

In one embodiment, the present invention includes a method of making a graphene/graphite oxide mixed with other hydrophilic powders, where the graphene/graphite oxide is made by a method comprising: obtaining graphene/graphite oxide flakes with a surface area to thickness ratio greater than 300 Angstroms, and thickness of less than 160 Angstroms, wherein the graphene flakes have no significant physical surface distortions, no significant epoxy functionalization, and has an oxidation level greater than 1.5% by mass; combining with Ordinary Portland Cement and other dry powders; mixing for at least 30 minutes in a sonic mixing system; and adding water to react the powders and form a cementitious composite when cured. In one aspect, the graphene/graphite oxide is greater than 0.00005% by mass of the dry powder material. In another aspect, at least one of the mechanical, electrical, or thermal physical properties are enhanced the addition of the graphene/graphite oxide. In another aspect, at least 95% of the graphene/graphite oxide flakes are from about 0.8 to 16 nanometers in thickness. In another aspect, at least 95% of the graphene/graphite oxide flakes have a surface area to thickness ratio of a minimum of 300 Angstroms. In another aspect, the maximum dimension of the graphene/graphite oxide flakes between 220 Angstroms and 100 microns. In another aspect, the graphene/graphite oxide flake has primarily edge oxidation. In another aspect, the flake surface has the same hydrophobicity as the other powders. In another aspect, the mechanochemical exfoliating graphite into graphene/graphite oxide flakes is done in a stirred media mill, and the stirred media mill is an Attrition mill or ball mill.

In another embodiment, the present invention includes a method of making a graphene/graphite oxide mixed with other hydrophobic powders, where the graphene/graphite oxide is made by a method comprising the steps of: obtaining graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level less than 1.5% by mass; combining with sand and other dry powders; and mixing for at least 30 minutes in a sonic mixing system. In one aspect, the graphene/graphite oxide is greater than 0.00005% by mass of the dry powder material. In another aspect, at least one of the mechanical, electrical, or thermal physical properties are enhanced the addition of the graphene/graphite oxide. In another aspect, at least 95% of the graphene/graphite oxide flakes are from about 0.8 to 16 nanometers in thickness. In another aspect, at least 95% of the graphene/graphite oxide flakes have a surface area to thickness ratio of a minimum of 300 Angstroms. In another aspect, the maximum dimension of the graphene/graphite oxide flakes between 220 Angstroms and 100 microns. In another aspect, the graphene/graphite oxide flake has primarily edge oxidation. In another aspect, the flake surface has the same hydrophobicity as the other powders. In another aspect, the mechanochemical exfoliating graphite into graphene/graphite oxide flakes in done in a stirred media mill, and the stirred media mill is an Attrition mill or ball mill.

In yet another embodiment, the present invention includes a graphene/graphite oxide preparation for making a cement comprising: graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level greater than 1.5% by mass combined with Ordinary Portland Cement and other dry powders; wherein the mixture is capable of forming a cementitious composite when cured in the presence of sufficient water.

Yet another embodiment includes a graphene/graphite cement composite comprising: graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level greater than 1.5% by mass combined with Ordinary Portland Cement and other dry powders; and sufficient water to react the powders and form a cementitious composite when cured.

In certain aspect, the graphene/graphite oxide flakes include: 95% of the flakes are from about 0.8 to 16 nanometers in thickness; 95% of the flakes have a surface area to thickness ratio of a minimum of 300 Angstroms; the maximum dimension of the flakes between 220 Angstroms and 100 microns; the graphene/graphite oxide flakes have only edge oxidation without the formation of epoxy groups; the flake surface has the same hydrophobicity as the bonding host; mechanically exfoliating graphite into graphene/graphite oxide flakes is done in a stirred media mill, also known as an attrition mill or ball mill; and/or the method outputs are substantially limited to substantially flat graphene/graphite oxide flakes and water.

This can also be a method of making a graphene/graphite oxide flakes dispersion, comprising: preparing graphene flakes with a surface area to thickness ratio greater than 300 Angstroms, and thickness of less than 160 Angstroms, wherein the graphene/graphite oxide flakes have only edge oxidation without the formation of epoxy groups and are substantially planar.

Recent publications have shown one possible route to produce a non-corrugated graphene through the process of ball milling crystalline graphite with dry ice; the mechanochemical processing of the crystalline graphite produces edge oxidized graphene flakes. This process shows the feasibility of an edge-only oxidized graphene flake, but the cost of this processing is more expensive than what is required by a commodity additive market. Note that planar graphene/graphite for research has also been produced by manually separating one layer at time from a piece of crystalline graphite. Needless to say this is far too slow and too expensive for commercial production. The Hummers' based process produces graphene that is not planar, generally weakens the graphite in a host.

Optimizing the interfacial bonding between the graphene/graphite oxide flake and host's matrix. Optimizing the interfacial bonding requires the two critical aspects, first is the providing of a planar pristine surface that is not distorted through the graphene/graphite oxide flake production process. Secondly is the modification of the chemistry of the additive to allow full entrainment of the additive in the host's matrix. For graphene/graphite oxide flakes this can be done by modifying the COOH group by thermal treatment or with chemical functionalization that can tailor the hydrophobicity and/or create a functional group that are similar to the host's chemistry (i.e., polarity, hydrophilicity, etc.). Functionalizing the graphene/graphite oxide additive with a similar chemistry to the host allows the graphene additive to be directly incorporated in the long or short range ordering or bonding. The host can include plastics, metals, cement, asphalt, ceramics and glass materials.

Thickness to the surface area of the graphene/graphite oxide flake: Using a planar graphene/graphite oxide flake the next issue of implementing in a host is the thickness to surface-area of the graphene flake. The thickness to surface-area ratio in addition to the lack of epoxy groups of the graphene/graphite oxide flake plays a significant role in the graphene flakes ability to positively impact the host's properties.

This requires a large surface area with a modest thickness conceptually comparable to the ideal larger area monolayer needed by the semiconductor industry. A large flat flake will conduct better phonons and electrons better than the host alone. A graphene/graphite oxide flake held bonded even by van der Waal forces is more desirable than a thin flake surrounded by an insulating host.

This is true for mechanical applications as well. As long as there is a larger surface area to thickness ratio the graphene can mitigate and distribute a mechanical load giving the host enhanced mechanical properties, increased tensile, shear, and flexural strength. The ability to achieve substantial enhancement of the host's mechanical properties can be obtained with a flake with an area of 48400 $Å^2$ with a flake thickness to 160 Å to 200 Angstroms. A 48400 $Å^2$ area flake with a thickness of 160 Å has a surface area to thickness ratio of about 300 Angstroms can also provide enhancement to the host's mechanical properties (preferably 95% of our flakes have a surface area to thickness ratio of a minimum of 300 Angstroms).

In some embodiments our flake thicknesses are 16 nanometers or less as too many layers significantly reduce the tensile strength (preferably 95% of our flakes are from about 0.8 to 16 nanometers), and our surface area to thickness ratio is greater than 48400 to 1 Angstroms. Preferably, the maximum dimension of the flake varies between 220 Angstroms and 100 microns. This requires precise process control or a process that allows separation of the graphene flakes by surface area and/or thickness.

Uniform distribution and entrainment: The third requirement is obtaining a uniform distribution, dispersion and/or entrainment of graphene/graphite oxide flake with an additional powder or multiple powders mixing prior to reacting, casting or otherwise causing the powders to become ordered by thermal, chemical, electrical or other processes that induce order or bonding to occur between the powders, e.g. solidified of gelled. Having a singular functionalization or decoration of COOH with substantially no epoxy groups allows the reaction between the powders to be optimized. Preferably greater than 0.1% (w) and less than 30% of oxidation of the graphene/graphite oxide is used in the powder mixed process.

DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Obtaining consistent size and thickness can require controlled pre-processing (e.g., milling and separation) of the crystalline graphite mechanochemical process that use crystalline graphite with a mild oxidizing agent in conjunction with mechanical energy (milling) for synthesis of graphene/graphite oxide flakes.

The mechanical energy in conjunction with a mild oxidizing environment can produce edge oxidation of the graphene minimizing the strong surface oxidation, formation of epoxy groups and mechanical defects generated in a Hummers' based process.

Graphite (30 g) can be used as the starting material for the graphene/graphite oxide flakes mechano-chemical process. The mechanochemical process can be done in what is generically referred to as a "stirred ball mill." A useful and simple equation describing the grinding momentum is M×V (mass×velocity), which enables us to see how an ball milling use up to 6 lbs (or ~2600 stainless steel balls) of 0.25" diameter stainless steel balls weighing 1 g each. Milling in a closed chamber for 360 minutes at 2,000 RPM or less. When grinding in the ball mill, as the balls (media) in their random movement are spinning in different rotation and therefore are exerting shearing forces on the crystalline graphite. The resulting graphene/graphite oxide preferably has edge-only oxidization flakes with a pristine surface primarily free of distortions, epoxy groups or corrugations with low surface energies allowing for easier incorporation and entrainment in a host through powder mixing resulting in enhance physical properties.

If the suspension application requires a narrow size distribution the edge oxidized graphene/graphite flake can be chemically separated via acidic precipitation by titrating hydrochloric acid into the bath the larger (thicker/heavier) material comes out of suspension first creating a narrow graphene oxide flake distribution. The particle size can be monitored during this process by a Dynamic Light Scattering measurement tool. Dynamic Light Scattering tools can resolve particle sizes down to 30 Å.

Preferably, the surface area to thickness ratio should be greater than about 300 to have a positive impact on the host as a suspension. The pH of the water containing the oxidized graphite/graphene oxide can range from 5 to 9 while maintaining the suspension of the media the pH of the resulting water/graphene/graphite oxide mixture is typically is about 7. A mechanochemical process can be controlled to process graphene/graphite with oxidization from 0.1% to 30%. Unless otherwise indicated or produced by the Hummer process, the term "graphene" as used herein means graphene/graphite with oxidization of from 0.1% to 30%. The functionalization can be COOH on the edge carbons preserving the graphene structure with substantially no epoxy groups.

Oxidized graphene/graphite produced by this method is typically hydrophilic and easily suspended in a neutral aqueous solution. The oxidized graphite can be kept in suspension until varying the pH of the solution.

A ball mill operating with less than or equal to 2000 RPM can be generally sufficient to prevent agglomeration of the graphene adhering to the milling balls or tank.

The graphene/graphite can be combined with the host powder or liquid in a mechanical agitation process.

Graphene/Graphite oxide flakes can be aligned using shearing and laminar forces for orientation and mixing along in addition to other methods such as: melt blending, counter rotating screw, sonication or other mixing processes of the graphene/graphite additive. Other powders that can be the cast, extruded or otherwise processed into the final product by inducing long or short range ordering or bonding through chemical, thermal, electrical, shearing, or mechanical treatments. The mixing to create uniform disbursement can be achieved in minutes to several hundred minutes in a ball mill or other mixing device.

Thus, in one non-limiting example, the present invention includes a method of making a graphene/graphite oxide mixed with other hydrophilic powders, where the graphene/graphite oxide is made by a method comprising: obtaining graphene/graphite oxide flakes with a surface area to thickness ratio greater than 300 Angstroms, and thickness of less than 160 Angstroms, wherein the graphene flakes have no significant physical surface distortions, no significant epoxy functionalization, and has an oxidation level greater than 1.5% by mass; combining with, e.g., Ordinary Portland Cement (and other dry powders); mixing for at least 30 minutes in a sonic mixing system; and adding water to react the powders and form a cementitious composite when cured. In one example, the graphene/graphite oxide is greater than 0.00005% by mass of the dry powder material. By combining the graphene/graphite oxide flakes, cement and water, one or more of the following has been modified: mechanical, electrical, or thermal physical properties, which are enhanced by the addition of the graphene/graphite oxide. In one example, at least 95% of the graphene/graphite oxide flakes are from about 0.8 to 16 nanometers in thickness. In another example, at least 95% of the graphene/graphite oxide flakes have a surface area to thickness ratio of a minimum of 300 Angstroms. Often, the maximum dimension of the graphene/graphite oxide flakes between 220 Angstroms and 100 microns. In one example, the graphene/graphite oxide flake has primarily edge oxidation. In another example, the flake surface has the same hydrophobicity as the other powders. The mechanochemical exfoliating graphite can be formed into graphene/graphite oxide flakes in a stirred media mill, and the stirred media mill is an Attrition mill or ball mill.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a graphene/graphite oxide mixed with other hydrophilic powders, where the graphene/graphite oxide is made by a method comprising:

obtaining graphene/graphite oxide flakes with a surface area to thickness ratio greater than 300 Angstroms, and thickness of less than 160 Angstroms, wherein the graphene flakes have no significant physical surface distortions, no significant epoxy functionalization, and has an oxidation level greater than 1.5% by mass;

combining with Ordinary Portland Cement and other dry powders;

mixing for at least 30 minutes in a sonic mixing system; and adding water to react the powders and form a cementitious composite when cured.

2. The method of claim 1, wherein the graphene/graphite oxide is greater than 0.00005% by mass of the dry powder material.

3. The method of claim 1, wherein at least one of the mechanical, electrical, or thermal physical properties are enhanced the addition of the graphene/graphite oxide.

4. The method of claim 1, wherein at least 95% of the graphene/graphite oxide flakes are from about 0.8 to 16 nanometers in thickness.

5. The method of claim 1, wherein at least 95% of the graphene/graphite oxide flakes have a surface area to thickness ratio of a minimum of 300 Angstroms.

6. The method of claim 1, wherein the maximum dimension of the graphene/graphite oxide flakes between 220 Angstroms and 100 microns.

7. The method of claim 1, wherein the graphene/graphite oxide flake has primarily edge oxidation.

8. The method of claim 1, wherein the flake surface has the same hydrophobicity as the other powders.

9. The method of claim 1, wherein the mechanochemical exfoliating graphite into graphene/graphite oxide flakes in done in a stirred media mill, and the stirred media mill is an Attrition mill or ball mill.

10. A method of making a graphene/graphite oxide mixed with other hydrophobic powders, where the graphene/graphite oxide is made by a method comprising the steps of:

obtaining Graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level less than 1.5% by mass;

combining with sand and other dry powders; and mixing for at least 30 minutes in a sonic mixing system.

11. The method of claim 10, wherein the graphene/graphite oxide is greater than 0.00005% by mass of the dry powder material.

12. The method of claim 10, wherein at least one of the mechanical, electrical, or thermal physical properties are enhanced the addition of the graphene/graphite oxide.

13. The method of claim 10, wherein at least 95% of the graphene/graphite oxide flakes are from about 0.8 to 16 nanometers in thickness.

14. The method of claim 10, wherein at least 95% of the graphene/graphite oxide flakes have a surface area to thickness ratio of a minimum of 300 Angstroms.

15. The method of claim 10, wherein the maximum dimension of the graphene/graphite oxide flakes between 220 Angstroms and 100 microns.

16. The method of claim 10, wherein the graphene/graphite oxide flake has primarily edge oxidation.

17. The method of claim 10, wherein the flake surface has the same hydrophobicity as the other powders.

18. The method of claim 10, wherein the mechanochemical exfoliating graphite into graphene/graphite oxide flakes in done in a stirred media mill, and the stirred media mill is an Attrition mill or ball mill.

19. A graphene/graphite oxide preparation for making a cement comprising:

graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level greater than 1.5% by mass combined with Ordinary Portland Cement and other dry powders; wherein the mixture is capable of forming a cementitious composite when cured in the presence of sufficient water.

20. A graphene/graphite cement composite comprising:

graphene/graphite oxide flakes with a surface area to thickness ratio greater than 300 Angstroms, and thickness of less than 160 Angstroms, wherein the graphene flakes have no significant physical surface distortions, having no significant epoxy functionalization and has an oxidation level greater than 1.5% by mass combined with Ordinary Portland Cement and other dry powders; and sufficient water to react the powders and form a cementitious composite when cured.

* * * * *